US011655654B2

(12) United States Patent
Martin et al.

(10) Patent No.: US 11,655,654 B2
(45) Date of Patent: *May 23, 2023

(54) DOOR LOCK BOLT PLATE PIVOT SYSTEM, AND ASSOCIATED STRUCTURES AND METHODS

(71) Applicant: Level Home, Inc., Redwood City, CA (US)

(72) Inventors: John H. Martin, Atherton, CA (US); Kenneth D. Goto, Redwood City, CA (US); Thomas E. King, Redwood City, CA (US); Jordan R. Fountain, Truckee, CA (US)

(73) Assignee: Level Home, Inc., Redwood City, CA (US)

( * ) Notice: Subject to any disclaimer, the term of this patent is extended or adjusted under 35 U.S.C. 154(b) by 410 days.

This patent is subject to a terminal disclaimer.

(21) Appl. No.: 16/866,910

(22) Filed: May 5, 2020

(65) Prior Publication Data

US 2020/0263450 A1    Aug. 20, 2020

Related U.S. Application Data

(62) Division of application No. 15/709,419, filed on Sep. 19, 2017, now Pat. No. 10,829,954.

(Continued)

(51) Int. Cl.
*E05B 15/02* (2006.01)
*E05B 47/02* (2006.01)
(Continued)

(52) U.S. Cl.
CPC .............. *E05B 47/00* (2013.01); *E05B 9/002* (2013.01); *E05B 9/02* (2013.01); *E05B 15/0205* (2013.01);
(Continued)

(58) Field of Classification Search
CPC ........................................................ E05B 9/02
See application file for complete search history.

(56) References Cited

U.S. PATENT DOCUMENTS 166,797 A    8/1875  Mix et al.
332,849 A    12/1885  Voll
(Continued)

FOREIGN PATENT DOCUMENTS

CN    104790761 A    7/2015
CN    205078005 U    3/2016
(Continued)

OTHER PUBLICATIONS

International Search Report and Written Opinion dated Dec. 21, 2017, for International Application No. PCT/US17/052351, 7 pages.
(Continued)

*Primary Examiner* — Carlos Lugo
(74) *Attorney, Agent, or Firm* — Perkins Coie LLP; Colin Fowler; Brian Coleman

(57) ABSTRACT

Disclosed are embodiments of a tapered bolt receiver for a door lock to accommodate misalignment, between a deadbolt mounted to a door, and an opposing jamb. The tapered bolt receiver can be configured to accommodate misalignment for a deadbolt having a non-tapered bolt, such as for an electromechanical smart lock having a battery stored within a battery compartment that is integrated with an enhanced bolt. Also disclosed are embodiments of a deadbolt plate pivot assembly that is pivotably mountable to a corresponding deadbolt assembly to define a plate pivot system, to accommodate a beveled door edge. An illustrative embodiment of the deadbolt plate pivot assembly includes opposing plate that captures a hinge assembly, which can include plastic plate hinges, which serve to locate the deadbolt plate pivot assembly with respect to a corresponding bolt housing, and can provide a spring force and/or constant torque when mounted to a beveled door.

19 Claims, 15 Drawing Sheets

Related U.S. Application Data

(60) Provisional application No. 62/396,794, filed on Sep. 19, 2016.

(51) Int. Cl.

| | |
|---|---|
| *E05B 47/00* | (2006.01) |
| *E05B 17/20* | (2006.01) |
| *E05B 17/22* | (2006.01) |
| *E05B 15/10* | (2006.01) |
| *E05B 17/00* | (2006.01) |
| *E05B 63/00* | (2006.01) |
| *E05B 33/00* | (2006.01) |
| *E05B 9/02* | (2006.01) |
| *E05B 15/16* | (2006.01) |
| *E05B 51/00* | (2006.01) |
| *E05B 45/06* | (2006.01) |
| *G01P 15/00* | (2006.01) |
| *G07C 9/00* | (2020.01) |
| *E05B 63/06* | (2006.01) |
| *E05B 9/00* | (2006.01) |

(52) U.S. Cl.
CPC .......... *E05B 15/10* (2013.01); *E05B 15/1621* (2013.01); *E05B 17/0004* (2013.01); *E05B 17/20* (2013.01); *E05B 17/2026* (2013.01); *E05B 17/2049* (2013.01); *E05B 17/22* (2013.01); *E05B 33/00* (2013.01); *E05B 45/06* (2013.01); *E05B 47/0001* (2013.01); *E05B 47/0012* (2013.01); *E05B 47/026* (2013.01); *E05B 51/005* (2013.01); *E05B 63/0056* (2013.01); *E05B 63/06* (2013.01); *G01P 15/005* (2013.01); *G07C 9/00174* (2013.01); *G07C 9/00182* (2013.01); *G07C 9/00944* (2013.01); *E05B 2009/004* (2013.01); *E05B 2015/023* (2013.01); *E05B 2045/067* (2013.01); *E05B 2047/002* (2013.01); *E05B 2047/003* (2013.01); *E05B 2047/0016* (2013.01); *E05B 2047/0024* (2013.01); *E05B 2047/0026* (2013.01); *E05B 2047/0034* (2013.01); *E05B 2047/0036* (2013.01); *E05B 2047/0048* (2013.01); *E05B 2047/0058* (2013.01); *E05B 2047/0059* (2013.01); *E05B 2047/0067* (2013.01); *E05B 2047/0069* (2013.01); *E05B 2047/0072* (2013.01); *E05B 2047/0081* (2013.01); *E05B 2047/0084* (2013.01); *E05B 2047/0094* (2013.01); *E05B 2047/0095* (2013.01); *G07C 9/00309* (2013.01); *G07C 2009/0019* (2013.01); *G07C 2009/00412* (2013.01); *G07C 2009/00769* (2013.01); *G07C 2209/62* (2013.01); *Y10S 292/60* (2013.01); *Y10T 292/096* (2015.04); *Y10T 292/0977* (2015.04); *Y10T 292/1021* (2015.04); *Y10T 292/62* (2015.04)

(56) References Cited

U.S. PATENT DOCUMENTS

| | | |
|---|---|---|
| 1,398,044 A | 11/1921 | Morris et al. |
| 2,497,189 A | 2/1950 | Shaffer |
| 2,655,030 A | 10/1953 | Schlage |
| 2,980,463 A | 4/1961 | Russell et al. |
| 2,996,326 A | 8/1961 | Schlage |
| 3,006,675 A | 10/1961 | Erickson |
| 3,036,850 A | 5/1962 | Schmid |
| 3,142,506 A | 7/1964 | Maurits et al. |
| 3,204,439 A | 9/1965 | Eads |
| 3,651,673 A | 3/1972 | Sendrowski et al. |
| 3,825,289 A | 7/1974 | Armstrong |
| 3,966,248 A | 6/1976 | James |
| 4,022,504 A | 5/1977 | Anderson |
| 4,500,122 A | 2/1985 | Douglas et al. |
| 4,505,504 A | 3/1985 | Matzkin et al. |
| D303,351 S | 9/1989 | Weinerman et al. |
| 4,871,202 A | 10/1989 | Friedrichs et al. |
| 5,620,216 A | 4/1997 | Fuller |
| 10,557,286 B2 | 2/2020 | Martin et al. |
| 2010/0236301 A1 | 9/2010 | Demster et al. |
| 2014/0260446 A1 | 9/2014 | Lila |
| 2018/0080245 A1 | 3/2018 | Martin et al. |
| 2018/0080247 A1 | 3/2018 | Martin et al. |
| 2019/0017290 A1 | 1/2019 | Dintheer |
| 2020/0115927 A1 | 4/2020 | Deyoung et al. |

FOREIGN PATENT DOCUMENTS

| | | |
|---|---|---|
| DE | 202010008334 U1 | 12/2010 |
| DE | 2020100008345 U1 | 1/2011 |
| DE | 202011003296 U | 5/2011 |
| EP | 1130197 A1 | 9/2001 |
| EP | 1239105 A1 | 9/2002 |
| EP | 1564353 A2 | 8/2005 |
| EP | 1724418 A1 | 11/2006 |
| GB | 947305 A | 1/1964 |

OTHER PUBLICATIONS

International Search Report and Written Opinion dated Dec. 28, 2017, for International Application No. PCT/US17/052348, 8 pages.

ABSTRACT

DOOR LOCK BOLT PLATE PIVOT SYSTEM, AND ASSOCIATED STRUCTURES AND METHODS

CROSS REFERENCE TO RELATED APPLICATIONS

This application is a Divisional Application of U.S. patent application Ser. No. 15/709,419, entitled "Door Lock Bolt Plate Pivot System, and Associated Structures and Methods" filed on Sep. 19, 2017, which claims the benefit of U.S. Provisional Application No. 62/396,794, entitled "Method, System and Apparatus for a Fully Functional Modern Day Smart Lock" filed on Sep. 19, 2016, which are incorporated herein in their entirety by this reference thereto.

FIELD OF THE INVENTION

At least one embodiment of the present invention pertains to a bolt plate pivot system and assembly for a door lock. At least one specific embodiment of the present invention pertains to a bolt plate pivot system and assembly for an electromechanical deadbolt lock, which can accommodate a beveled door.

BACKGROUND

A deadbolt receiver, commonly known as a strike plate, utilizes a hole in which receives a deadbolt. Such a deadbolt receiver is commonly mounted within a door jamb, or in some applications is mounted to a jamb surface of an opposing door, such as for double door installation, e.g., French doors.

Many door installations suffer from one or more sources of misalignment between a door and a corresponding jamb, such that a conventional deadbolt mounted to the door is often misaligned with its corresponding deadbolt receiver.

To accommodate such misalignments, beyond in situ adjustments and/or repairs, conventional deadbolts commonly include a substantial tapered profile, such as to ease the deadbolt through a non-aligned receiver. In some products, the deadbolts are intentionally undersized, to extend to their full throw, i.e., their locked position, with a decreased chance of interference with the deadbolt receiver.

In addition to door and/or jamb misalignment, doors are often beveled to be able to swing into the jamb without interference between the door and the jamb. Currently, American National Standards Institute (ANSI) standard front doors allow for a bevel edge of up to ⅛ inch for a standard 2 inch thick door, thus having a bevel angle of about 3.5 degrees. This results in the edge of the door not being perpendicular to the bolt door hole. Current deadbolt manufacturers overcome this by increasing gaps in bolt plates, and/or by using smaller diameter deadbolts.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

Disclosed are embodiments of a tapered deadbolt receiver plate to accommodate misalignment between a deadbolt mounted to and extendable from a door, and an opposing jamb.

In some embodiments, the tapered deadbolt receiver plate can be configured to accommodate misalignment for a deadbolt having a non-tapered bolt, such as for an electromechanical smart lock having a battery stored within a battery compartment that is accessible through an enhanced bolt having an exposed battery cap.

Also disclosed are embodiments of a deadbolt plate pivot assembly that is pivotably mountable to a corresponding deadbolt assembly, to accommodate a beveled door edge. In some embodiments, the deadbolt plate pivot assembly can be used with a large diameter deadbolt, while fully accommodating such a beveled door.

An illustrative embodiment of the deadbolt plate pivot assembly includes opposing plate that captures a hinge assembly, which can include plastic plate hinges, which serve to locate the deadbolt plate pivot assembly with respect to a corresponding bolt housing.

In some embodiments, the plastic plate hinges provide a spring force and/or constant torque when mounted to a beveled door.

Also described are methods for assembling a deadbolt plate pivot assembly with respect to a corresponding deadbolt assembly, and for installing the deadbolt assembly that includes the deadbolt plate pivot assembly to a beveled door.

Figure 1:
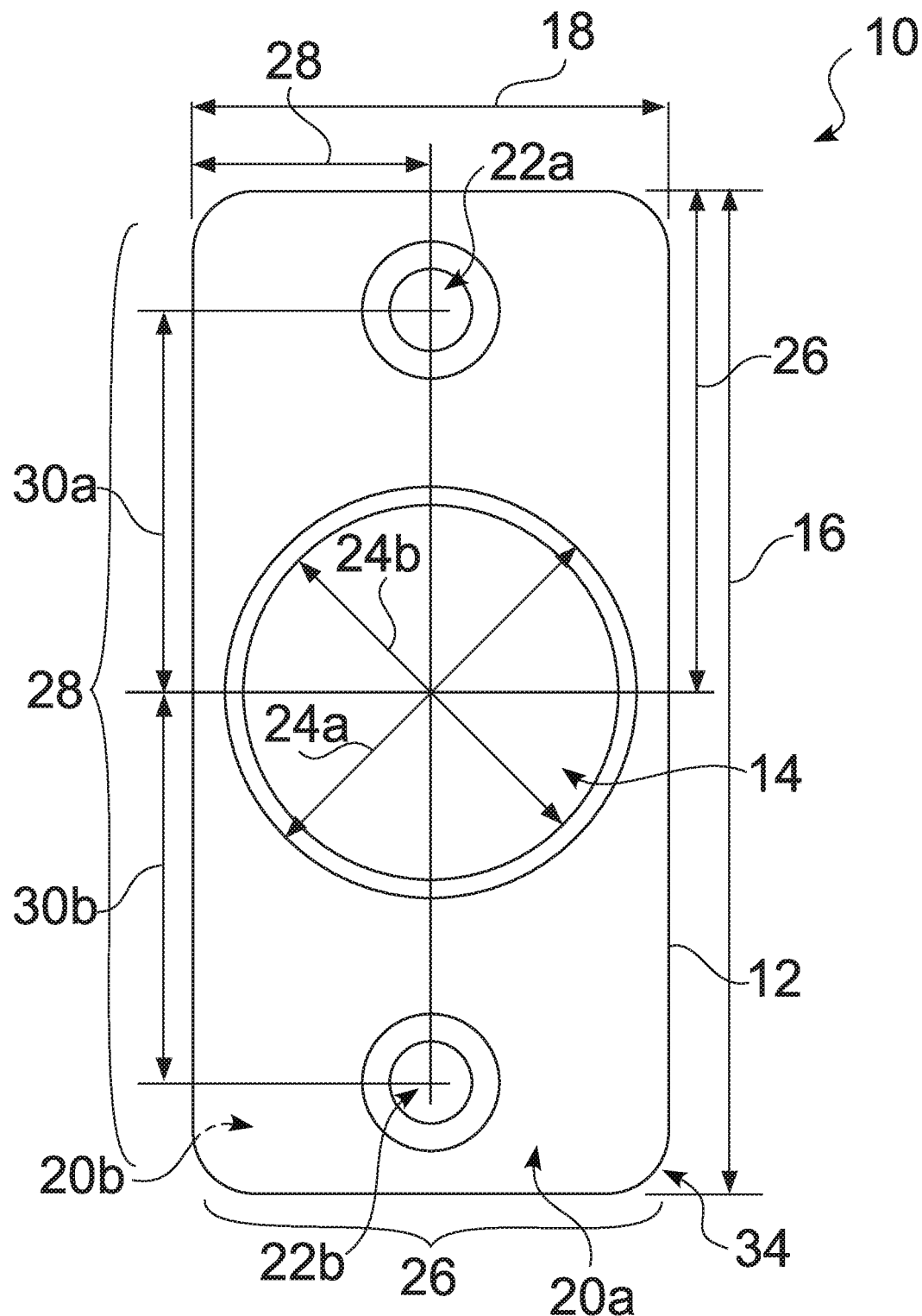
FIG. 1 is a front view of an illustrative embodiment of a tapered bolt receiver for a deadbolt assembly.
Figure 2:
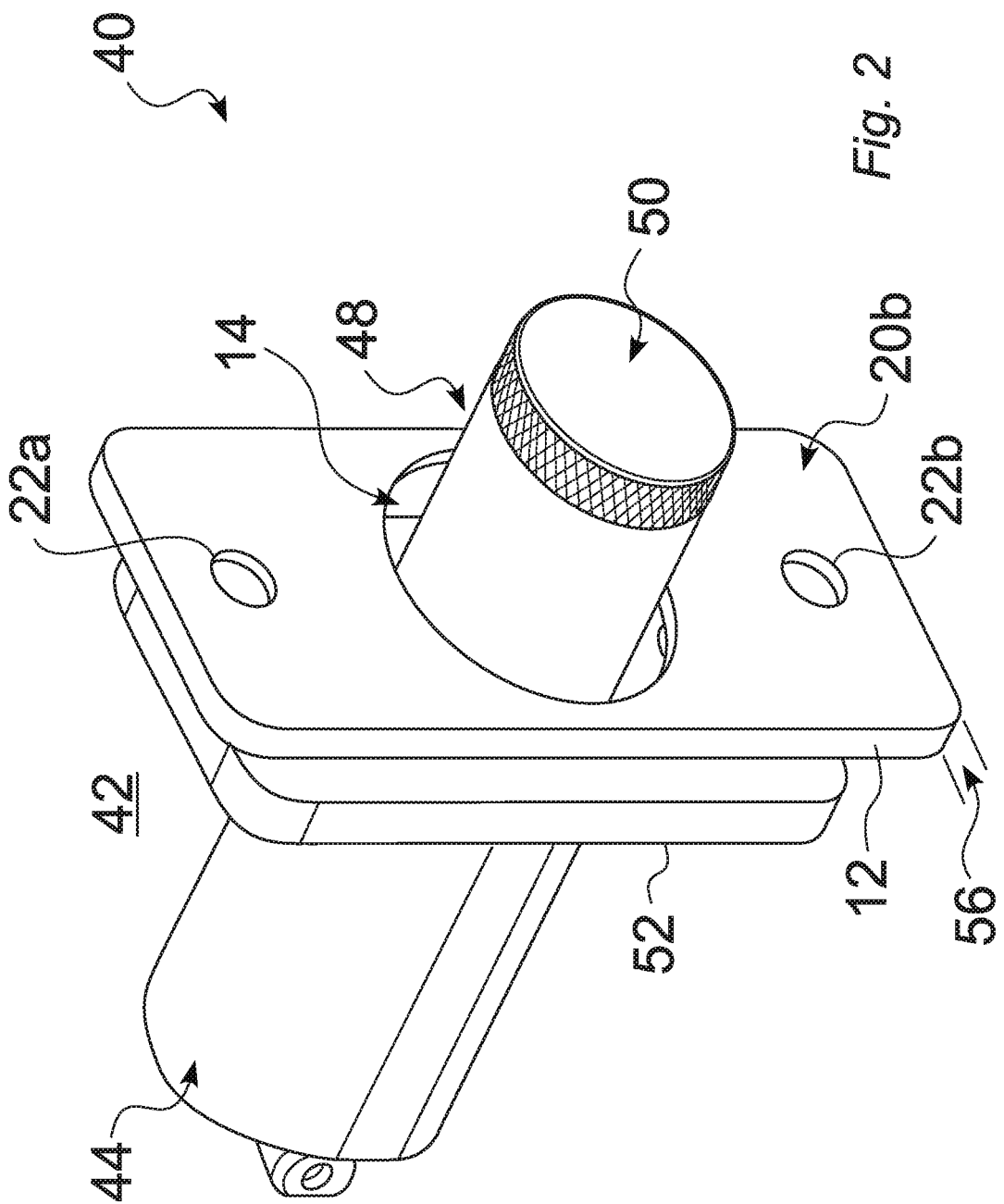
FIG. 2 is a partial perspective view of an illustrative embodiment of a deadbolt assembly having a front plate and a tapered bolt receiver.

FIG. 1 is a front view 10 of an illustrative embodiment of a tapered bolt receiver 12 for a deadbolt assembly 42 (FIG. 2). The illustrative tapered bolt receiver 12 seen in FIG. 1 has a characteristic thickness 56 (FIG. 2), and includes a front surface 20a and a rear surface 20b opposite the front surface 20a, and includes a tapered receiver hole 14 defined therethrough. As seen in FIG. 1, an outer diameter 24a of the tapered receiver hole 14 at the front surface 20a is larger the inner diameter 24b of the tapered receiver hole 14 at the rear surface 20b, thus defining a tapered profile for receiving a leading edge 202 (FIG. 5) of a bolt 48 (FIG. 2), such as defined by a battery cap 50 (FIG. 2) connected to a bolt 48. The tapered bolt receiver 12 can accommodate misalignment for a deadbolt assembly 42 having a non-tapered bolt 48 and/or battery cap 50, such as for an electromechanical smart lock having a battery 102 stored within a battery compartment that is integrated with an enhanced bolt 48.

The illustrative tapered bolt receiver 12 seen in FIG. 1 is generally rectangular in shape, having opposing edges 26 and sides 28, and has a characteristic height 16 and width 18. In some embodiments, the illustrative tapered bolt receiver 12 can include radiused corners 34, such as to correspond to a door jamb 708 (FIG. 14) that has been routed for locating and mounting the tapered bolt receiver 12.

The tapered receiver hole 14 seen in FIG. 1 is located at a distance 26 from an upper edge 26, and at a distance 28 from a left side 28. In some embodiments, the tapered receiver hole 14 is centered with respect to the edges 26 and sides 28.

The illustrative tapered bolt receiver 12 seen in FIG. 1 also includes fastener holes 22, e.g., 22a, 22b, such as vertically aligned with the tapered receiver hole 14, and separated vertically by distances 30a, 30b, respectively.

The illustrative symmetric tapered bolt receiver 12 seen in FIG. 1, can readily be mounted in a similar manner to that of a conventional receiver plate with respect to a jamb 708 (FIG. 14), and in some embodiments can be used with a corresponding jamb box, which in some embodiments can correspond to the size and shape of the inner receiver hole 24b.

While the illustrative symmetric tapered bolt receiver 12 seen in FIG. 1 includes a circular tapered receiver hole 14, other embodiments of the tapered receiver hole 14 can have different profiles to correspond to the leading edge, e.g., a battery cap 50 (FIG. 2), of the bolt 48.

Figure 3:
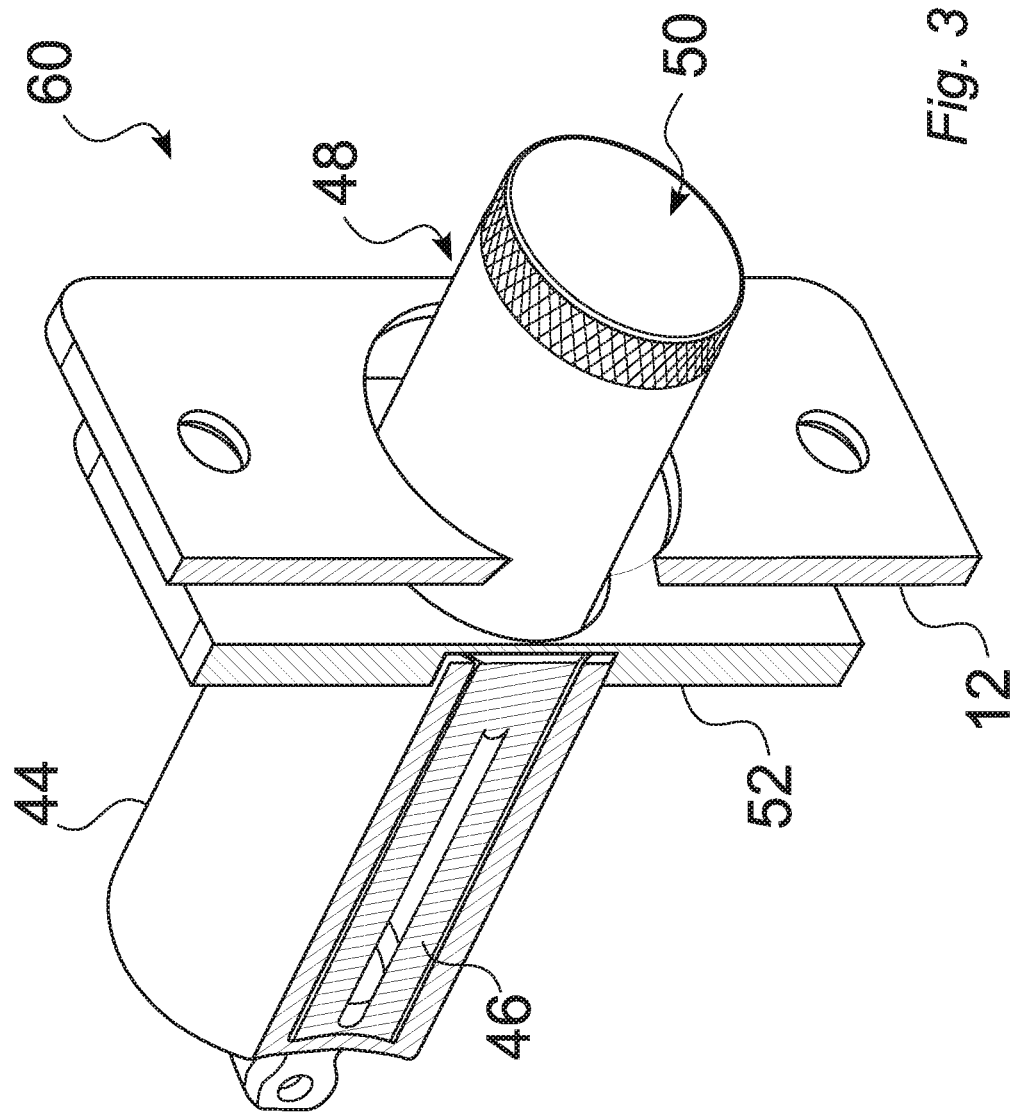
FIG. 3 is a partial perspective cutaway view of an illustrative embodiment of a deadbolt assembly having a front plate and a tapered bolt receiver.

FIG. 2 is a partial perspective view 40 of an illustrative embodiment of a deadbolt assembly 42 having a front plate 52 and a tapered bolt receiver 12. FIG. 3 is a partial perspective cutaway view 60 of an illustrative embodiment of a deadbolt assembly 42 having a front plate 52 and a tapered bolt receiver 12.

Figure 14:
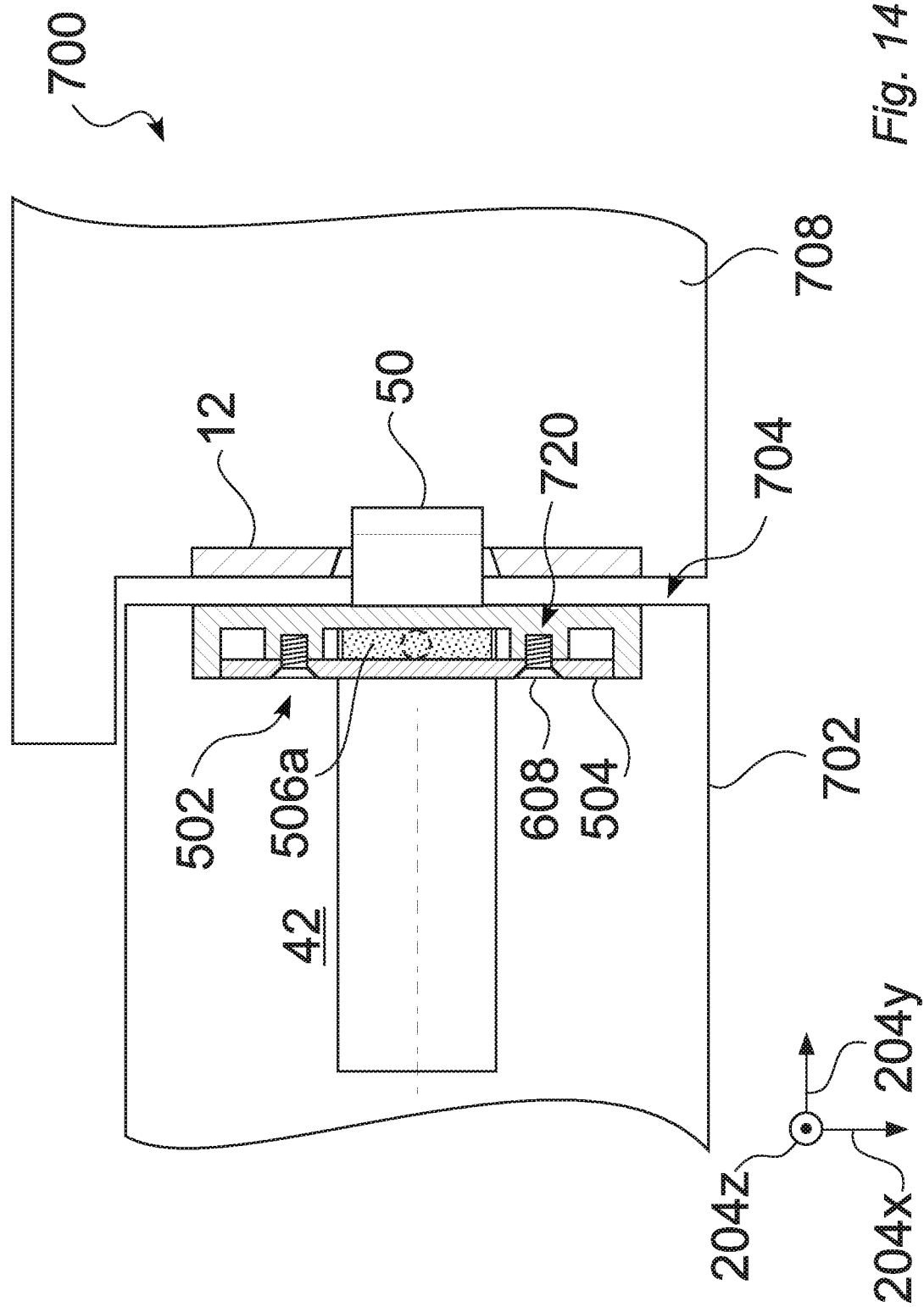
FIG. 14 is a partial top cutaway view of an illustrative deadbolt plate pivot assembly that is mounted to a door having a non-beveled, i.e., square edge.

The illustrative deadbolt assembly 42 seen in FIG. 2 and FIG. 3 includes a bolt sleeve 46 located within bolt housing 44, for mounting within a door 702 (FIG. 14). The illustrative bolt 48 seen in FIG. 2 and FIG. 3 is extendable from the deadbolt assembly 42, such as from a fully retracted position, in which the leading edge 202 of the bolt 48 is located flush to the face plate 21, or retracted further within the assembly 42, to a fully extended position 410 (FIG. 7), in which the leading edge 202 of the bolt 48 extends through the tapered receiver hole 14 of the tapered bolt receiver 12, such as to lock a door 702 (FIG. 14) with respect to a door jamb 708 (FIG. 14).

Figure 4:
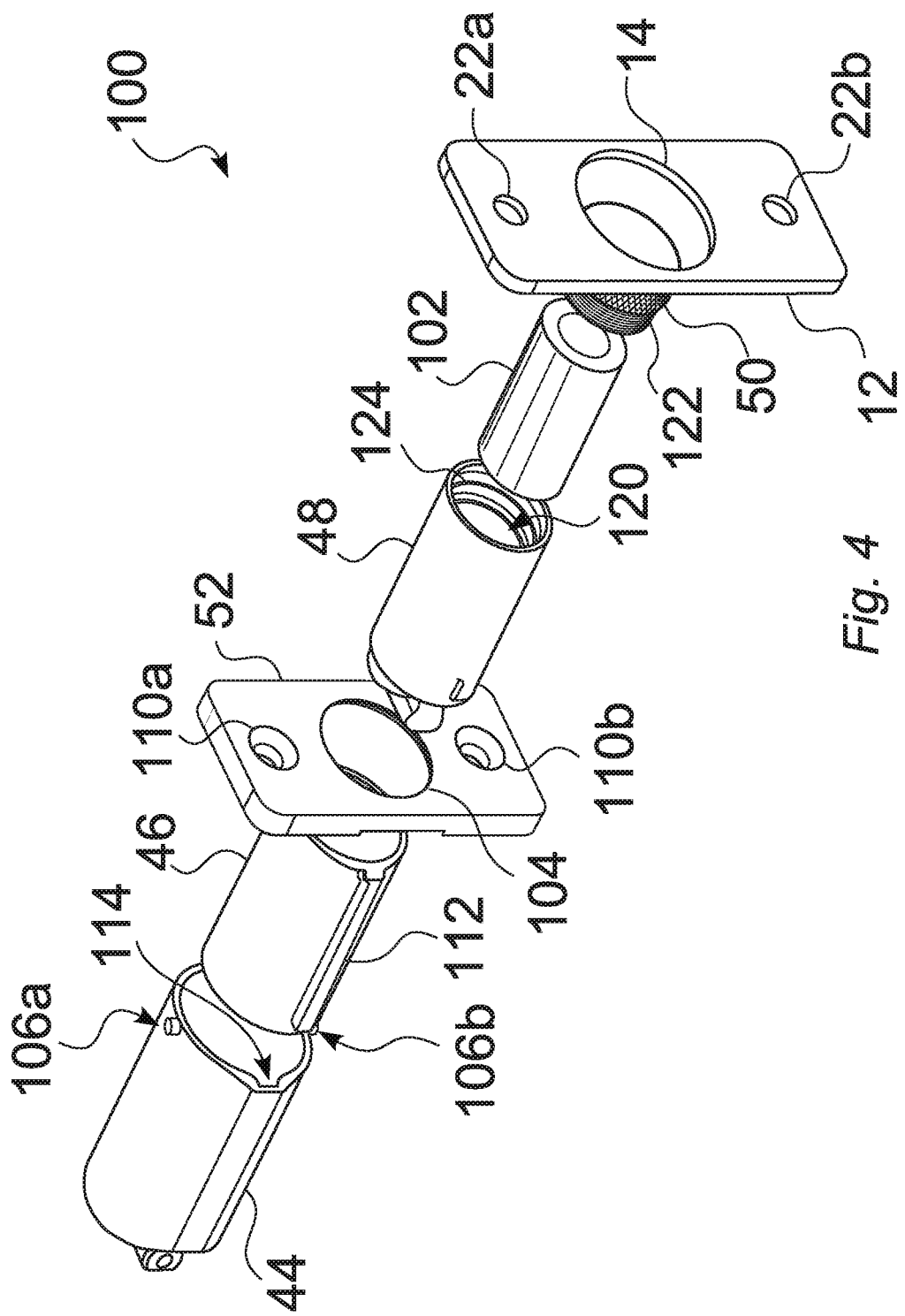
FIG. 4 is an expanded assembly view of an illustrative embodiment of a deadbolt assembly having a front plate and a tapered bolt receiver.
Figure 15:
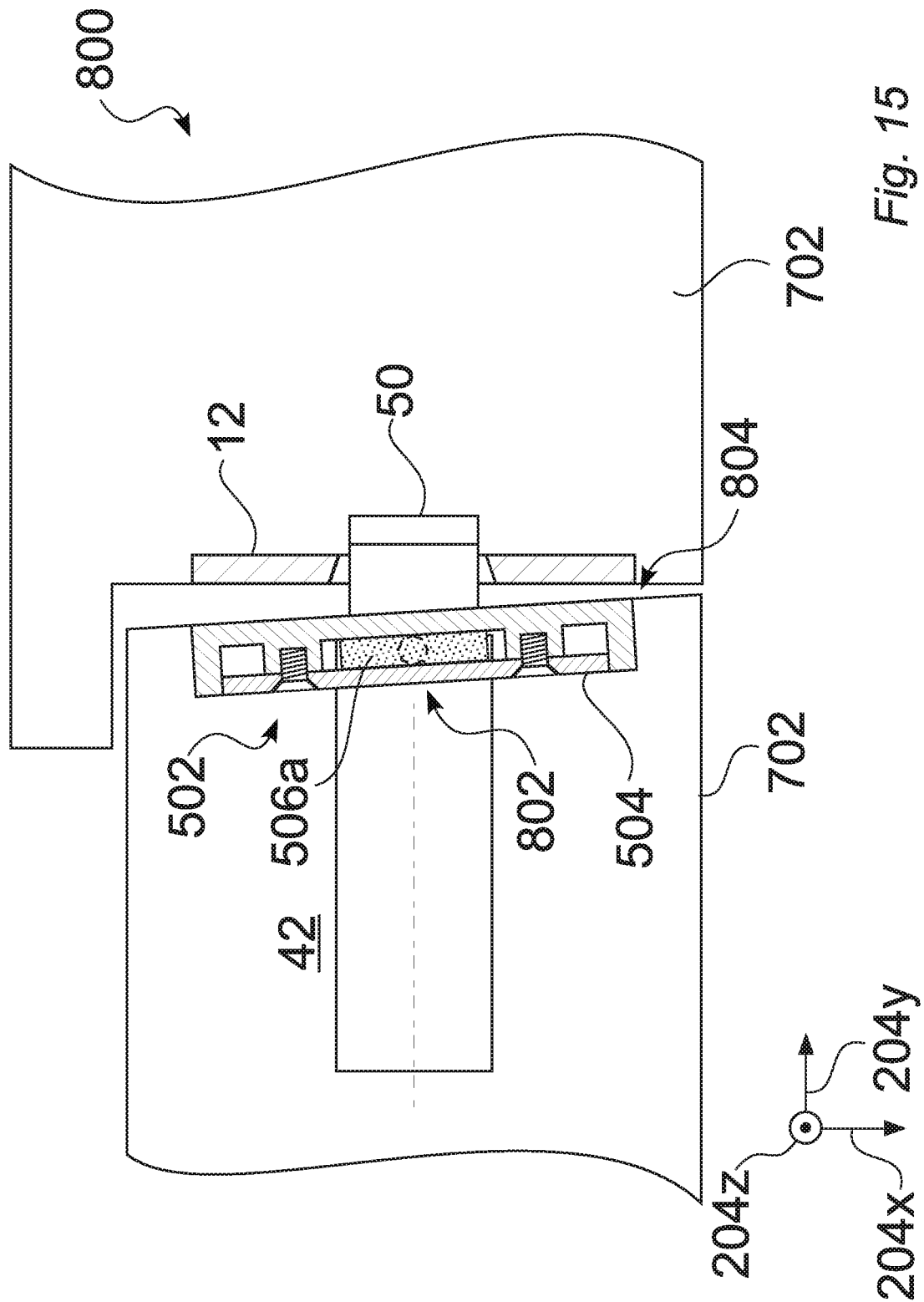
FIG. 15 is a partial top cutaway view of an illustrative deadbolt plate pivot assembly that is mounted to a door having a beveled, i.e., non-square edge.

FIG. 4 is an expanded assembly view 100 of an illustrative embodiment of a deadbolt assembly 42 having a front plate 52, such as to be used with a tapered bolt receiver 12. The illustrative deadbolt assembly 42 includes a bolt housing 44, in which the leading end of the bolt housing 44 includes pivot mounting pins 106, e.g., an upper pivot mounting pin 106a and a lower pivot mounting pin 106b, which as described below, can be used to retain a deadbolt plate pivot assembly (FIG. 12) that can be used to accommodate a beveled door 702 (FIG. 15).

The illustrative deadbolt assembly 42 also includes bolt sleeve 46 that is slidably locatable within the bolt housing 44, such as by one or more longitudinal ridges 112 on the bolt sleeve 46, which correspond to one or more longitudinal grooves 114 defined within the interior of the bolt housing 44.

The illustrative front plate 52 seen in FIG. 4 includes a hole 104 defined therethrough, through which the bolt 48 can extend from the interior of the bolt sleeve 46, such as by manual or electromechanical action of the deadbolt assembly 42. The front plate 52 seen in FIG. 4 also includes fastener holes 110, e.g., 110a, 110b, defined therethrough, by which the deadlock assembly 42 can be affixed to a door 702.

A battery 102 can be slidably inserted and stored within an interior region 120 defined in the bolt 48. In some embodiments, the battery 102 comprises a CR2 dry-cell 3.0 Volt dc battery, having a length of 27.0 mm, and a diameter of 15.1-15.6 mm, such as Model No. EL1CRBP Lithium Battery, available through Energizer Holding, Inc., Town and Country, Mo.

The illustrative deadbolt assembly 42 seen in FIG. 4 also includes battery cap 50 that is used to retain the battery 102 within the interior region 120 of the bolt 48, and to provide an electrical connection to the battery 102. The battery cap 50 typically includes outer threads 122 that correspond to inner threads 124 defined within the interior region 120 of the bolt 48.

The battery cap 50 seen in FIG. 4 defines a leading end 202 (FIG. 5) of the bolt 48, which can be retracted for a door 702 to be opened, and extended to engage the bolt 42 through a tapered receiver hole 14 of a tapered bolt receiver 12.

Operation of Deadbolt with Tapered Bolt Receiver.

Figure 5:
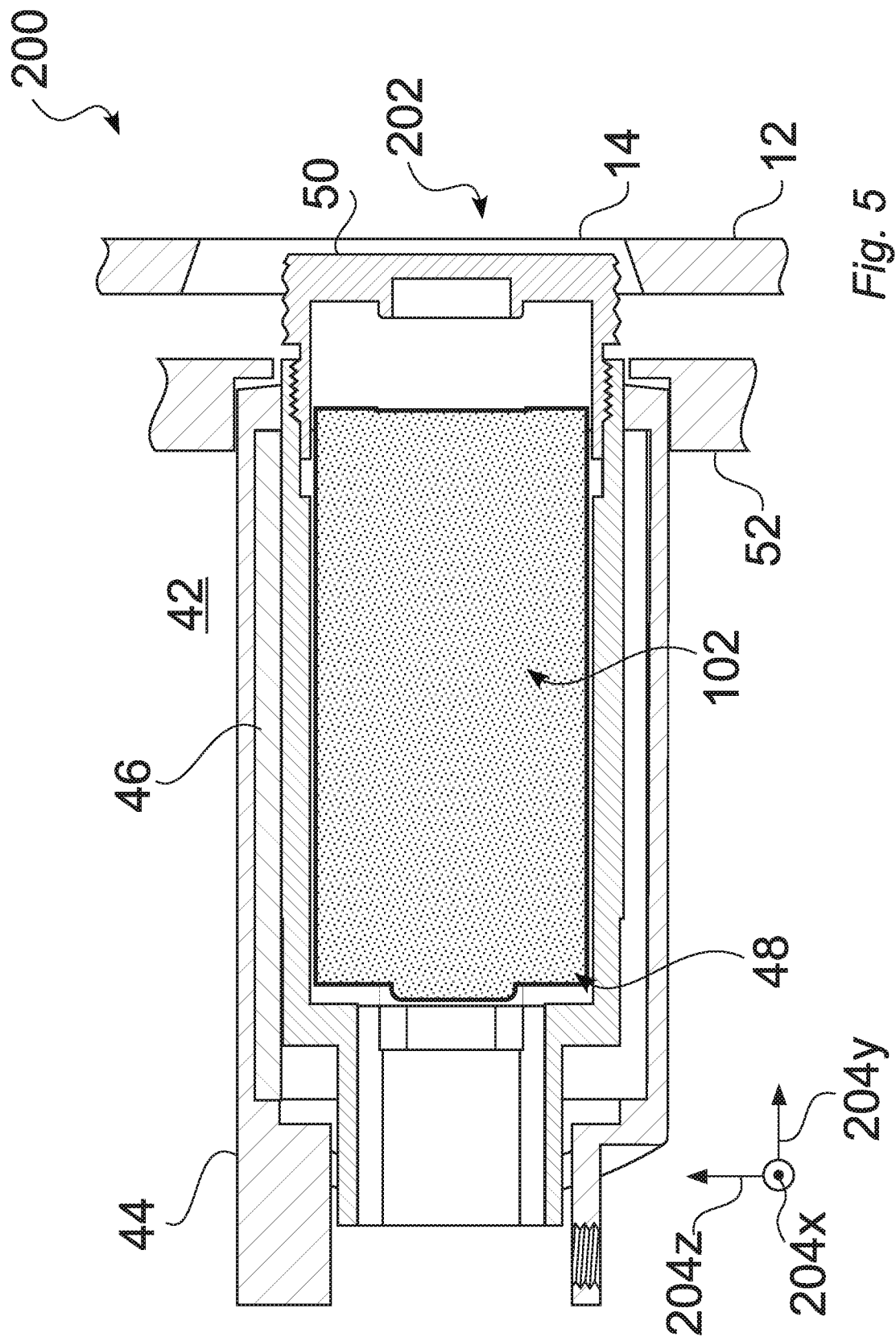
FIG. 5 is side cutaway view of an illustrative embodiment of a deadbolt assembly, in which the leading end of the bolt is extended to contact the surface of a tapered receiver hole of a tapered bolt receiver.
Figure 6:
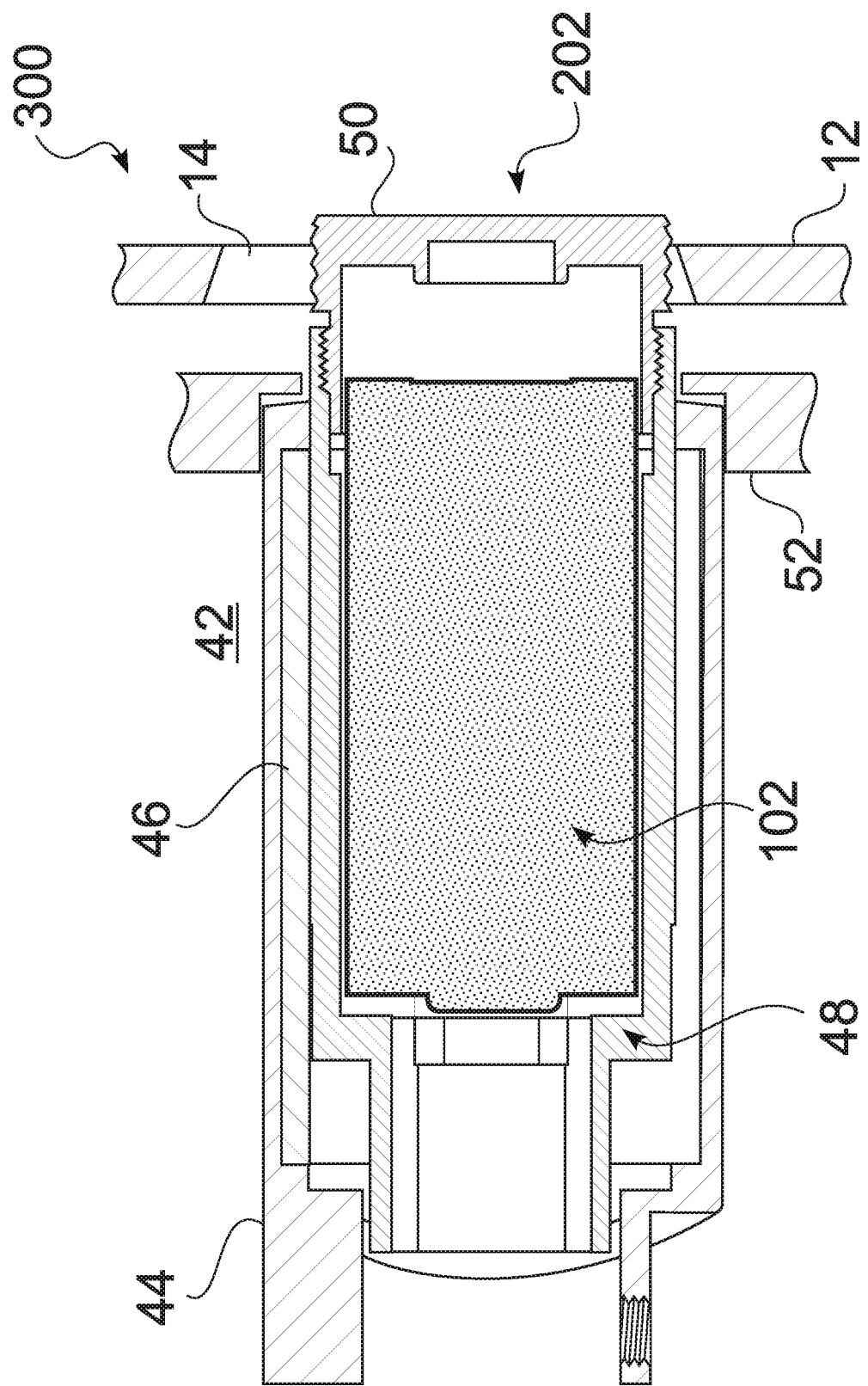
FIG. 6 is side cutaway view of an illustrative embodiment of a deadbolt assembly, in which the leading end of the bolt is extended through a tapered receiver hole of a tapered bolt receiver.
Figure 7:
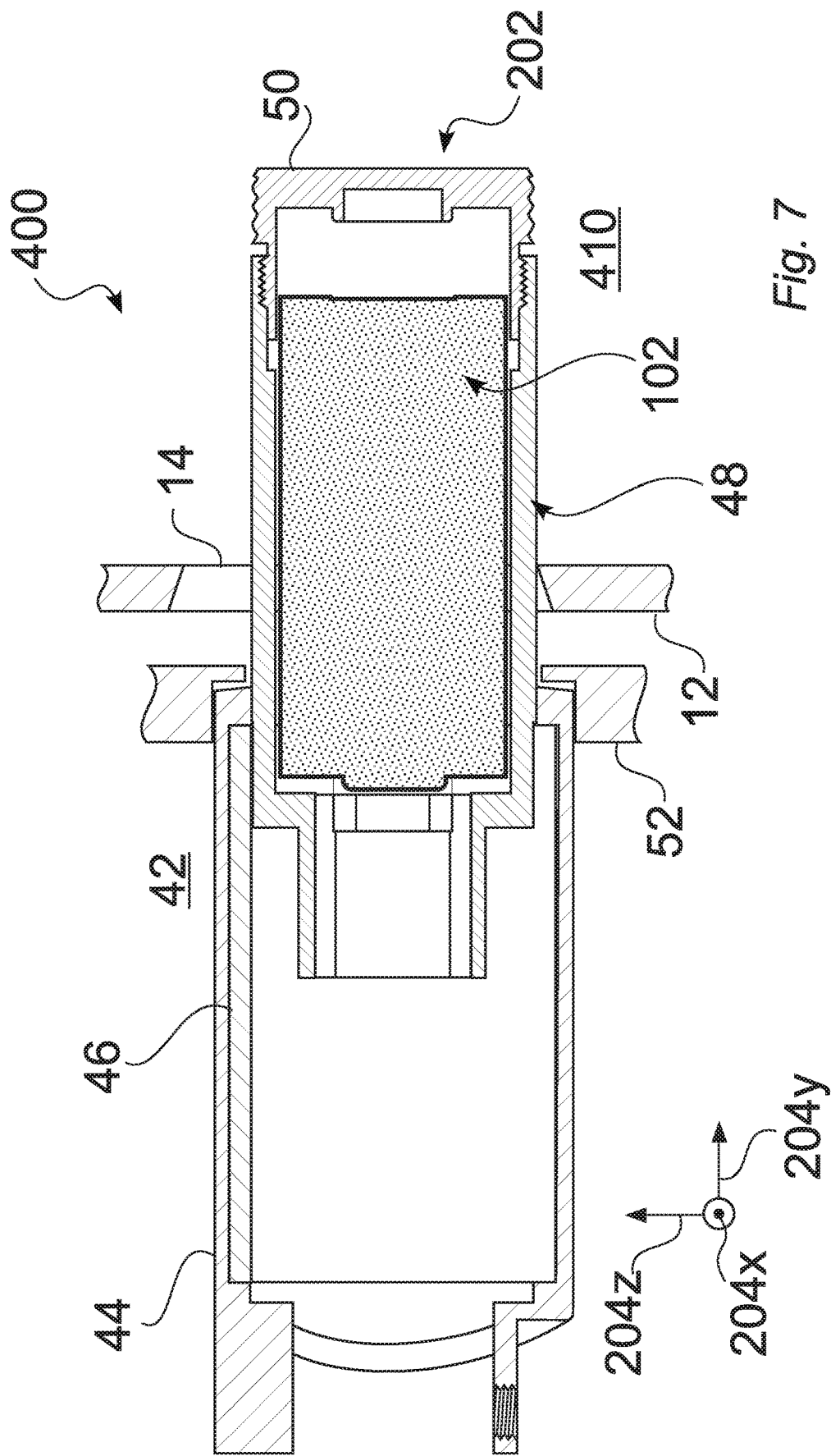
FIG. 7 is side cutaway view of an illustrative embodiment of a deadbolt assembly, in which the leading end of the bolt is fully extended to a locker position through a tapered receiver hole of a tapered bolt receiver.

FIG. 5 is side cutaway view 200 of an illustrative embodiment of a deadbolt assembly 42, in which the leading end 202 of the bolt 48 is extended, e.g., such as corresponding to axis 204y, to contact the surface of a tapered receiver hole 14 of a tapered bolt receiver 12. FIG. 6 is side cutaway view 300 of an illustrative embodiment of a deadbolt assembly 42, in which the leading end 202 of the bolt 48 is extended further through a tapered receiver hole 14 of a tapered bolt receiver 12. FIG. 7 is side cutaway view 400 of an illustrative embodiment of a deadbolt assembly 42, in which the leading end 202 of the bolt is fully extended 410, such as to a locked position, through a tapered receiver hole 14 of a tapered bolt receiver 12.

The deadbolt assembly 42 seen in FIGS. 5-7 includes a generally non-tapered lead end 202, using a bolt cap 50 that is threadably connected to the bolt 48, to provide user access to a battery 102. The illustrative bolt cap 50 seen in FIGS. 5-7 has a lead end 202 that corresponds to the full diameter of the bolt 48, which is compensated by the use of the tapered bolt receiver 12.

Figure 8:
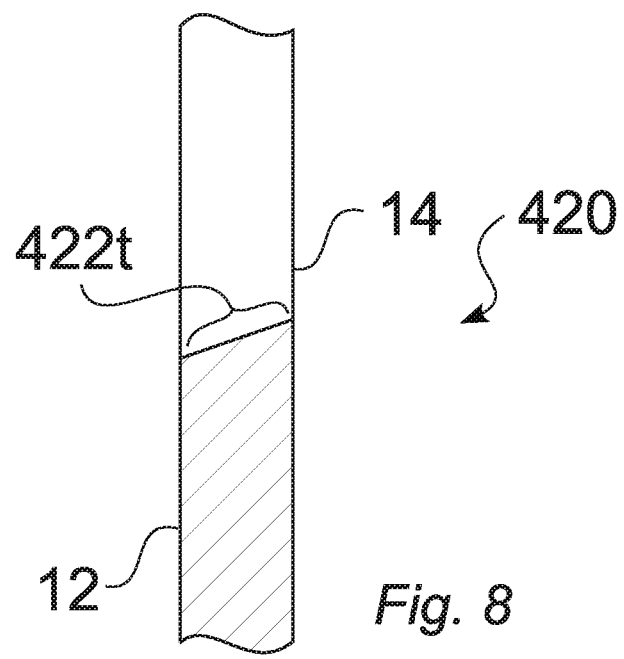
FIG. 8 is a partial detailed cutaway view of an illustrative tapered bolt receiver in which the tapered receiver hole includes a linear tapered profile.
Figure 9:
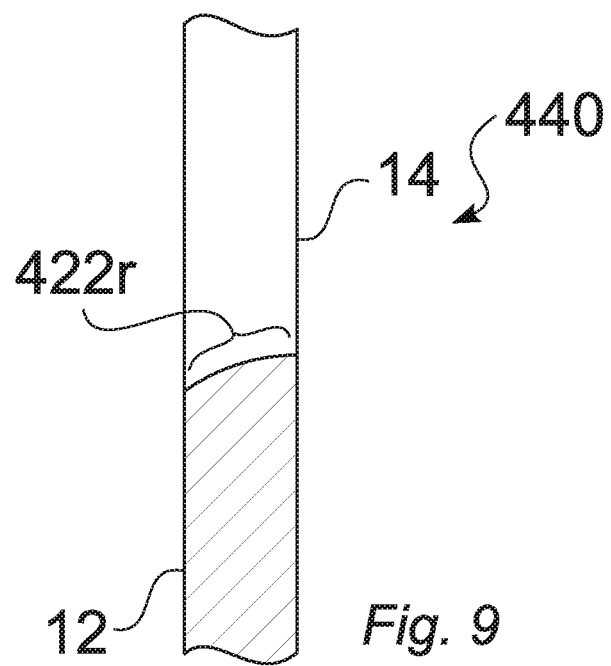
FIG. 9 is a partial detailed cutaway view of an illustrative tapered bolt receiver in which the tapered receiver hole includes a radiused tapered profile.

The tapered bolt receiver 12 has a beveled opening 14, which can provide a few degrees of guide for the bolt 48. FIG. 8 is a partial detailed cutaway view 420 of an illustrative tapered bolt receiver 12 in which the tapered bolt receiver hole 14 includes a linear tapered profile 422t. FIG. 9 is a partial detailed cutaway view 440 of an illustrative tapered bolt receiver 12 in which the tapered bolt receiver hole 14 includes a radiused tapered profile 422r. In some embodiments, the specific tapered profile 422 is determined based on the profile of the lead end 202 of the bolt 48. In some embodiments the specific tapered profile 422 can be asymmetric, such as to provide different taper profile in the horizontal and/or vertical direction.

Figure 10:
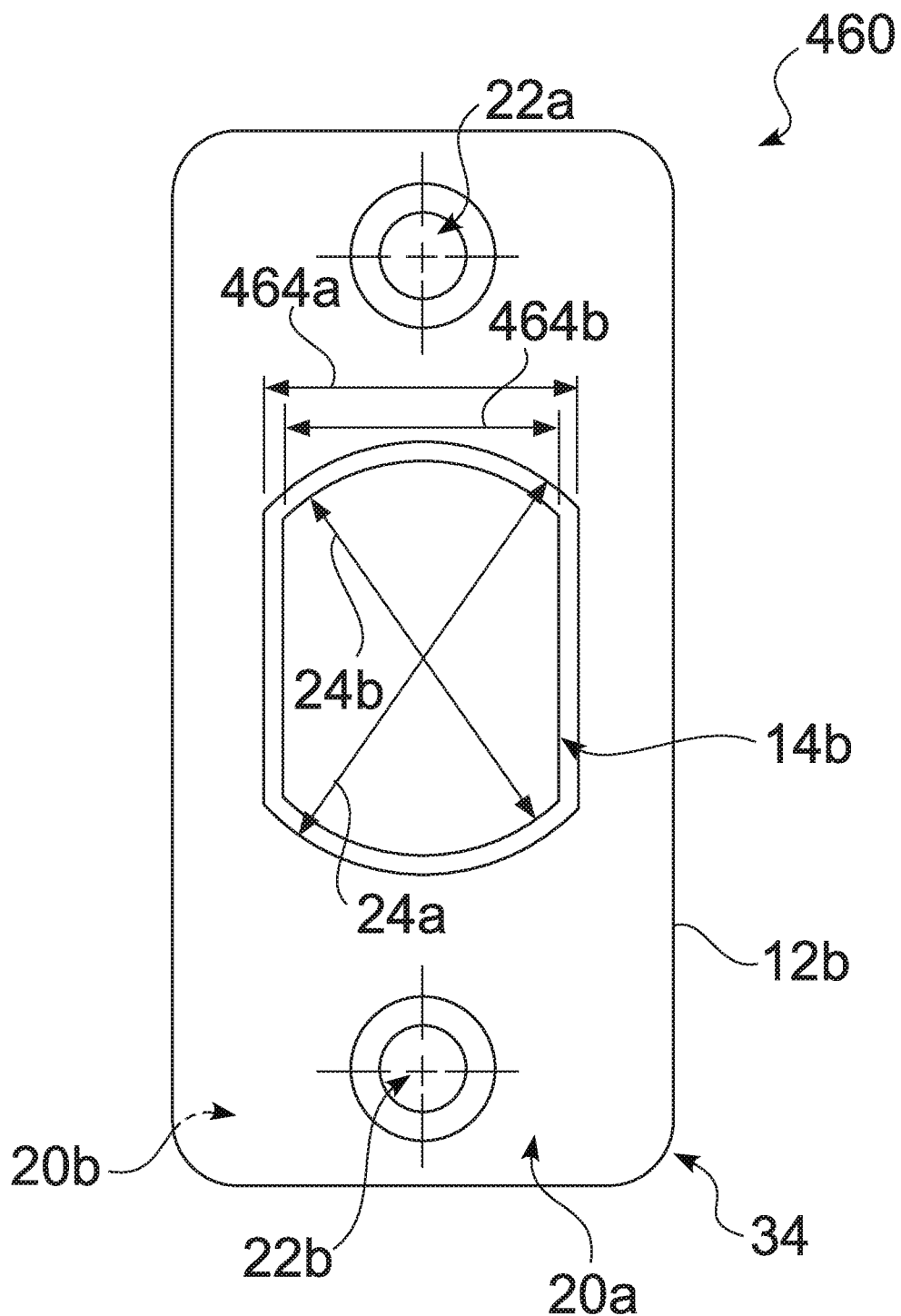
FIG. 10 is a front view of an illustrative embodiment of a tapered bolt receiver for a deadbolt assembly, in which the tapered bolt receiver hole includes a circular upper and lower profile and vertical sides.
Figure 11:
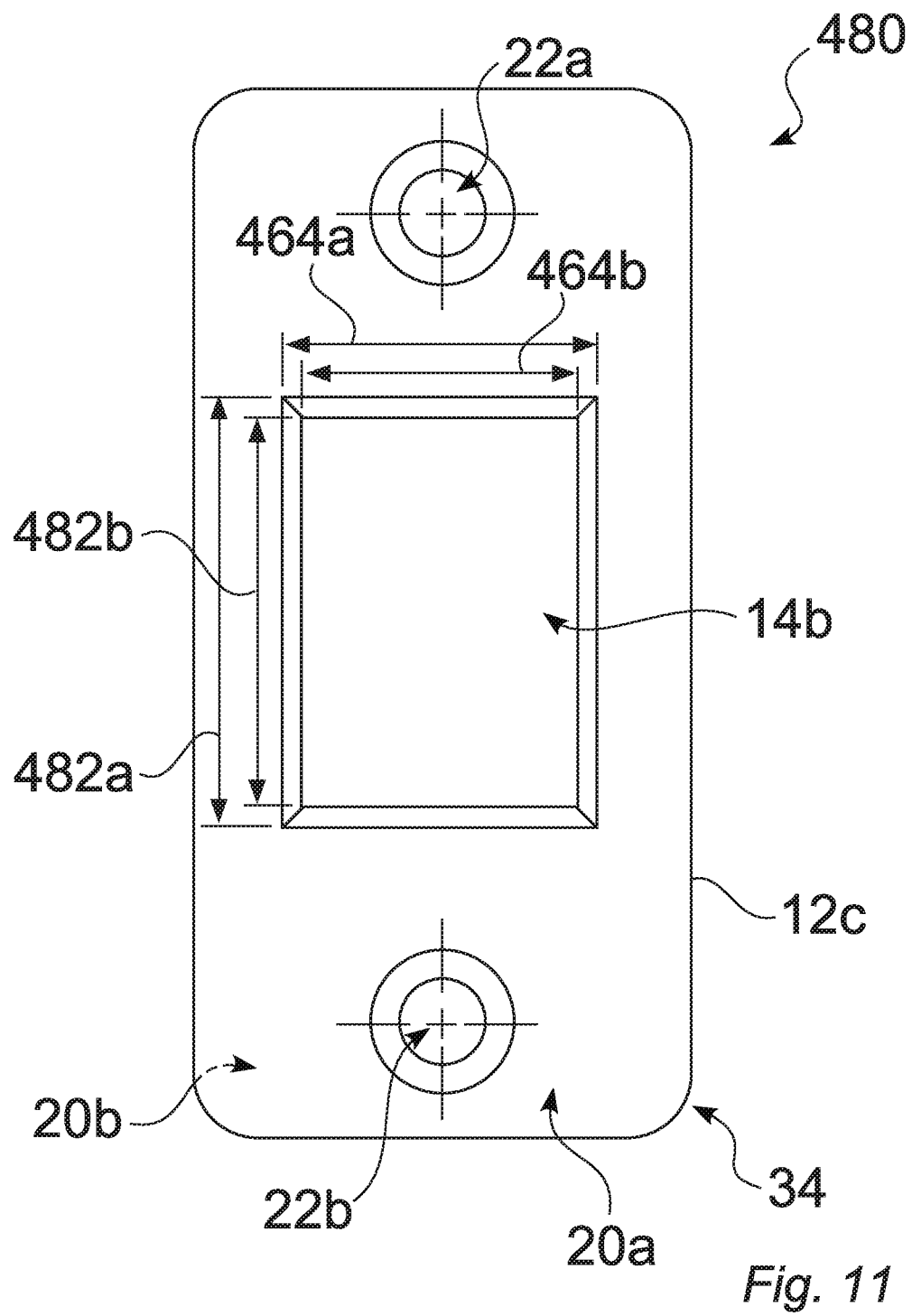
FIG. 11 is a front view of an illustrative embodiment of a tapered bolt receiver for a deadbolt assembly, in which a rectangular tapered bolt receiver hole includes vertical sides and horizontal ends.

FIG. 10 is a front view of an illustrative embodiment of a tapered bolt receiver 12, e.g., 12b, for a deadbolt assembly, in which the tapered bolt receiver hole 14 includes a circular upper and lower profile, e.g., having corresponding diameters 24a, 24b, and vertical sides, separated by corresponding widths 464a, 464b. FIG. 11 is a front view 480 of an illustrative embodiment of a tapered bolt receiver 12, e.g., 12c, for a deadbolt assembly, in which a rectangular tapered bolt receiver hole 14b includes vertical sides having corresponding heights 482a, 482b, and horizontal ends, having corresponding widths 464a, 464b. As seen in FIGS. 1, 10, and 11, tapered bolt receiver 12 can suitably be adapted to provide a variety of different shapes.

In operation, the tapered bolt receiver 12 can achieve alignment for the interface, without the use of a tapered bolt 48. The tapered bolt receiver 12 can guide the lead end 202 of the bolt 48 in, such as toward the fully extended position 410, and allows at least some misalignment to be absorbed. As such, the tapered bolt receiver 12 can provide tolerance for as-built conditions, e.g., any of swelling, settling, or installation.

Deadbolt Plate Pivot Assemblies.

In addition to door and/or jamb misalignment, doors are often beveled to be able to swing into the jamb without interference between the door and the jamb. Currently, American National Standards Institute (ANSI) standard front doors allow for a bevel edge of up to ⅛ inch for a standard 2 inch thick door, thus having a bevel angle of about 3.5 degrees. This results in the edge of the door not being perpendicular to the bolt door hole. Current deadbolt manufacturers overcome this by increasing gaps in bolt plates, and/or by using smaller diameter deadbolts.

Some embodiments of the deadbolt assemblies 42 disclosed herein can include deadbolt pivot plate assemblies 502 (FIGS. 9-11) and methods 900 (FIG. 16), which can fully accommodate such a beveled door 702 (FIG. 14).

Figure 12:
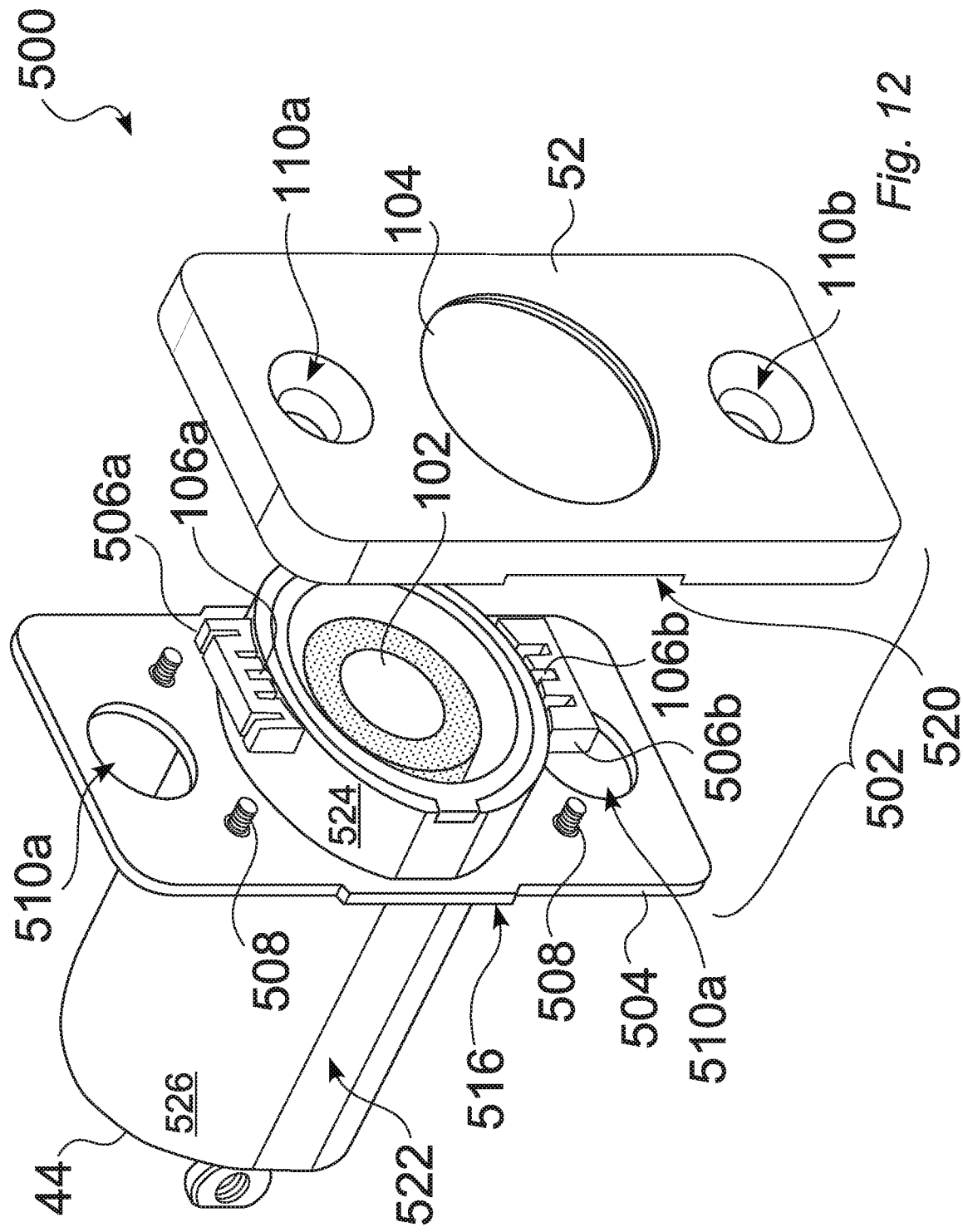
FIG. 12 is an expanded assembly view of a pivotable front plate in relation to a deadbolt assembly.
Figure 13:
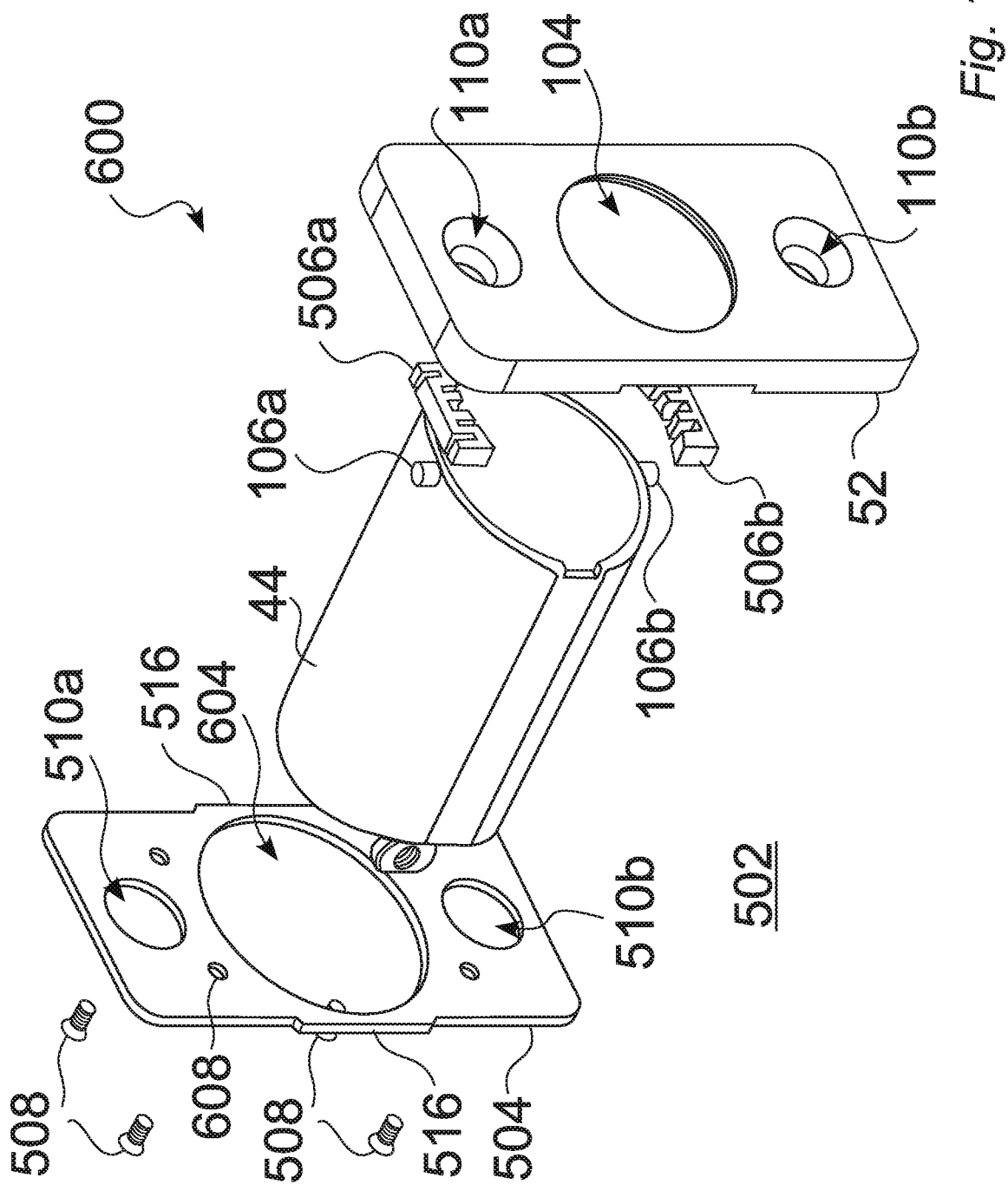
FIG. 13 is an expanded assembly view of a pivotable front plate in relation to a bolt housing deadbolt assembly, in which the bolt housing includes upper and lower plate hinge pivots on a leading end.

FIG. 12 is an expanded assembly view of a door lock bolt plate pivot system 500, comprising a deadbolt plate pivot assembly 502 for a corresponding deadbolt assembly 42. FIG. 13 is an expanded assembly view 600 of a deadbolt plate pivot assembly 502 in relation to a bolt housing deadbolt assembly 42, in which the bolt housing 44 includes upper and lower plate hinge pivots 106a, 106b, on a leading end.

FIG. 14 is a partial top cutaway view 600 of an illustrative deadbolt plate pivot assembly 502 that is mounted to a door 702 having a non-beveled, i.e., square edge 704. FIG. 15 is a partial top cutaway view of an illustrative deadbolt plate pivot assembly 502 that is mounted to a door 702 having a beveled, i.e., non-square, edge 804. The illustrative doors 702 seen in FIG. 14 and FIG. 15 are hinged to rotate about axis 204z, such as across a plane defined by 204x and 204y, and in the closed position, the doors 704 and deadlock assemblies 42 aligned with respect to axis 204y.

The deadbolt plate pivot assembly 502 includes two opposing plates, e.g., a front plate 52 and a back plate 504, that capture a hinges 106, e.g., 106a, 106b, which in some embodiments comprise a constant torque hinge 106. The constant torque hinges 106 allow the user U to install the deadbolt 42 as one normally would, and secure with screws, causing the bolt hinges 106 to rotate (FIG. 15), such as to accommodate a beveled door edge 804 (FIG. 15).

The illustrative back plate 504 seen in FIG. 12 and FIG. 13 includes a hole 606 defined therethrough, through which the bolt housing 44 can be slidably positioned to assemble the deadbolt plate pivot assembly 502. The illustrative back plate 504 seen in FIG. 12 and FIG. 13 also includes door fastener holes 510, e.g., 510a, 510b, defined therethrough, by which the deadlock assembly 42 can be affixed to a door 702. As well, the illustrative back plate 504 seen in FIG. 12 and FIG. 13 also includes assembly fastener holes 608 defined therethrough, by which the back plate 504 can be affixed to the front plate 52, by fasteners 508.

In contrast to a conventional door plate, which typically includes loosely fit parts, that can rattle until they are secured to a door 702, the deadbolt plate pivot assembly 502 provides a robust high-quality solution accommodate beveled door edges 804.

The illustrative bolt housing 44 seen in FIG. 12 and FIG. 13 utilizes two pins 106, e.g., 106a, 106b, that are captured between the two plates 52, 504 of the deadbolt plate pivot assembly 502. The illustrative deadbolt plate pivot assembly 502 seen in FIG. 12 and FIG. 13 includes molded plastic plate hinges 506, e.g., 506a, 506b, which are installed around corresponding pins 106a, 106b, to provide a spring force 802 (FIG. 15), e.g., torsion, and a location mechanism, behind the front plate 52, and captured by the back plate 504.

As discussed above, doors 702 are often beveled 804 by a few degrees, such as during installation or during service, so that when the door 702 closes, the door 702 can pass the jamb 702 into a closed position, wherein the door can be latched and if desired, locked.

To compensate of different door bevel conditions, conventional door faceplates typically include very loose tolerances in their construction, and are usually pretty thin. Consequently, such face plate often wobble and rattle until they are screwed down into the face of a wood door 702.

In contrast to conventional techniques, the deadbolt plate pivot assembly 502 provides a robust, high-quality structure that can be securely pre-assembled to a deadbolt assembly 42, and can provide improved tolerances, such as with respect to the bolt 48 and bolt cap 50.

The deadbolt plate pivot assembly 502 is securely supported by the plate hinges 506a, 506b, e.g., constant-torque hinges 506, which before mounting, can rest in a square position, i.e., aligned with the deadbolt assembly 42, and can be securely positioned and affixed to a door 702 throughout a range of bevel conditions 804. For instance, in some embodiments, the deadbolt plate pivot assembly 502 provides a bevel range of plus or minus 3.5 degrees.

The deadbolt plate pivot assembly 502 therefore provides very solid construction. As the deadbolt assembly 42 is fastened to the door 702, the deadbolt plate pivot assembly 502 conforms to bevel 804 of the door 710.

An illustrative embodiment of a door lock bolt plate pivot system 500 comprises a bolt housing 44 for a deadbolt assembly 42, wherein the bolt housing 46 has an exterior surface 522 (FIG. 12) and includes a rear end 526 (FIG. 12) and a front end 524 (FIG. 12) opposite the rear end 526, and a pair of vertically-aligned pivot mounting pins 106a, 106b located on the exterior surface 522 of the bolt housing 44 at the front end 524, a back plate 504 having an outer surface and an inner surface opposite the outer surface, wherein the inner surface and the outer surface extend from an upper end to a lower end, the back plate 505 including a central deadbolt hole 604 defined though the back plate 504 from the outer surface to the inner surface, through which the rear end 526 of the bolt housing 44 can pass, an upper fastener hole 510a defined though the back plate 504a from the outer surface to the inner surface, wherein the upper door fastener hole 504a is located between the central deadbolt hole 604 and the upper end, a lower door fastener hole 510b defined though the back plate 504 from the outer surface to the inner surface, wherein the upper door fastener hole 510b is located between the central deadbolt hole 604 and the lower end, and a plurality of assembly fastener holes 608 defined though the back plate 504 from the outer surface to the inner surface, a front plate 52 having an outer surface and an inner surface opposite the outer surface, wherein the inner surface and the outer surface extend from an upper end to a lower end, the front plate 52 including a central hole 104 defined though the front plate 52 from the outer surface to the inner surface, through which a bolt 48 of the deadbolt assembly can extend, an upper door fastener hole 110a defined though the front plate 52 from the outer surface to the inner surface, wherein the upper door fastener hole 110a is located between the central hole 104 and the upper end, a lower fastener hole 110b defined though the back plate 52 from the outer surface to the inner surface, wherein the upper door fastener hole 110b is located between the central hole 104 and the lower end, a plurality of threaded fastener holes 720 defined on the inner surface, a pair of plastic plate hinges 506a, 506b pivotably located on respective vertically-aligned pivot mounting pins 106a, 106b and a plurality of assembly fasteners 508 extending from the outer surface of the back plate 504, through the assembly fastener holes 608, and threadably attached to the plurality of threaded fastener holes 710 on the inner surface of the front plate 52, wherein the plastic plate hinges 506a, 506b are confined between the back plate 504 and the front plate 52, to define the deadbolt pivot plate assembly 502, wherein the deadbolt pivot plate assembly 502 is affixed to the front end 524 of the bolt housing 44 through the hinges 506a, 506b to define the door lock bolt plate pivot system, wherein the deadbolt pivot plate assembly 502 is vertically pivotable with respect to the bolt housing 44.

Construction of Deadbolt Plate Pivot Assembly and Installation.

Figure 16:
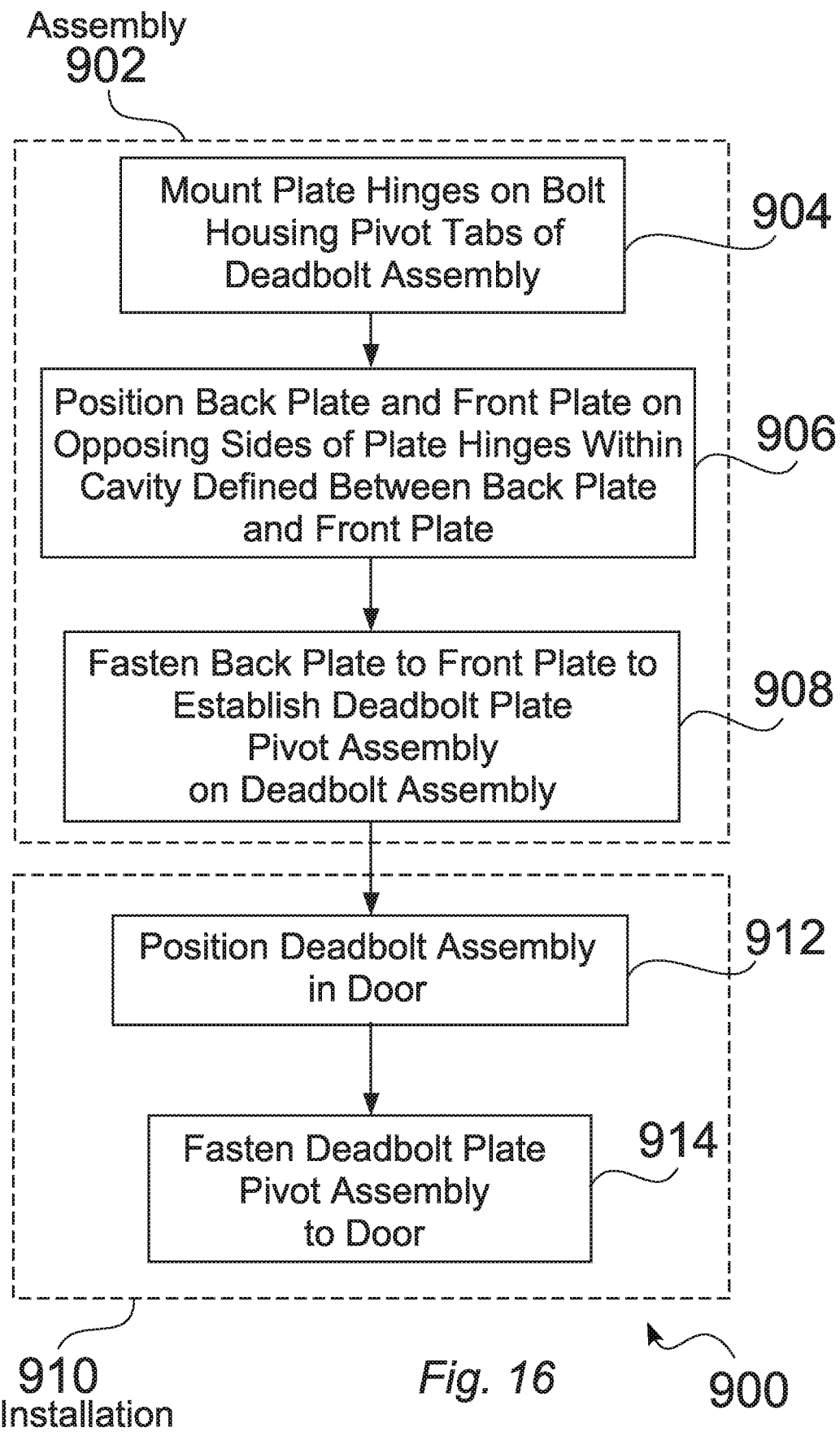
FIG. 16 is a flowchart of an illustrative method for assembling and installing a deadbolt plate pivot assembly, to accommodate a variety of beveled door conditions.

FIG. 16 is a flowchart of an illustrative method 900 for assembling 902 a deadbolt plate pivot assembly 502, and installing 910 an assembled deadlock assembly 502 that includes an assembled deadbolt plate pivot assembly 502, to accommodate a variety of beveled door conditions 804.

The illustrative construction 902 of a deadbolt plate pivot assembly 502, such as seen in FIG. 16, can be performed at any time, such as during manufacture of the deadbolt assembly, or after acquisition by a user U, such as just before installation 910. The illustrative construction 902 seen in FIG. 16 includes mounting 904 the plate hinges 506, e.g., 506a, 506b, to their corresponding upper and lower pivots tabs 106, 106a, 106b (FIG. 4) located on the bolt housing 44. The opposing plates 52, 504 are then positioned 906 on opposing sides of the plate hinges 506, wherein the plate hinges 596 are confined within a cavity defined between the back plate 504 and the front plate 52. The opposing plates 52, 504 can include corresponding recesses 520 (FIG. 12) and tabs 516 (FIG. 12), respectively, to aid in alignment between the plates 52, 505. The opposing plates 52, 504 are then fastened together 908, such as with fasteners 508 that extend through assembly fastener holes 608 and into threaded holes 720 (FIG. 14) defined in the front plate 52.

FIG. 14 also shows an illustrative installation 910 of an assembled deadlock assembly 502 that includes an assembled deadbolt plate pivot assembly 502, in which the assembled deadlock assembly 502 is readily positioned 912 within deadlock hole within a door 702, and is then fastened to the door 702, using fasteners that extend through holes 110, e.g., 110a, 110b, and 510, e.g., 510a, 510b, and into the door 702.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A deadbolt pivot plate assembly for a door jamb assembly having a bolt housing that adjusts a deadbolt assembly for misalignments between a door and the door jamb assembly, the deadbolt pivot plate assembly comprising:
   a hinge assembly that is mountable and pivotable with respect to a hinge pin provided on an outer lead end of the bolt housing; and
   opposing plates that, when coupled together, capture the hinge assembly such that the hinge assembly is disposed between the opposing plates to define the deadbolt pivot plate assembly;
   wherein the deadbolt pivot plate assembly is affixed to the outer lead end of the bolt housing through the hinge assembly; and
   wherein the deadbolt pivot plate assembly is pivotable.

2. The deadbolt pivot plate assembly of claim 1, wherein the hinge assembly includes a pair of hinges that are vertically pivotable throughout a range of motion.

3. The deadbolt pivot plate assembly of claim 2, wherein the hinge assembly provides a torsional spring force throughout the range of motion.

4. The deadbolt pivot plate assembly of claim 2, wherein the pair of hinges are constant torque hinges.

5. The deadbolt pivot plate assembly of claim 1, wherein the opposing plates comprise a front plate and a back plate and wherein the back plate includes a pair of alignment tabs on opposing sides of the back plate, and wherein the front plate includes a pair of corresponding alignment slots defined on opposing sides of the front plate, wherein the pair of alignment tabs fit within the corresponding alignment slots to align the back plate with the front plate.

6. The deadbolt pivot plate assembly of claim 1, wherein the deadbolt pivot plate assembly accommodates installation on the door having a beveled door edge.

7. The deadbolt pivot plate assembly of claim 1, wherein the deadbolt pivot plate assembly provides a rattle-free attachment to the deadbolt assembly before attachment to the door.

8. The deadbolt pivot plate assembly of claim 1, wherein the deadbolt pivot plate assembly includes a second plate hinge disposed upon the bolt housing and coupled with the opposing plates, the second plate hinge being on an opposite side of the bolt housing from the outer lead end of the bolt housing.

9. A method that adjusts a deadbolt for misalignments between a door and a door jamb comprising:
- mounting a pair of plate hinges on corresponding upper and lower tabs that extend from a bolt housing of a deadbolt assembly;
- positioning a back plate and a front plate on opposing sides of the plate hinges, wherein the plate hinges are located within a cavity defined between the back plate and the front plate; and
- fastening the back plate to the front plate to confine the plate hinges within the cavity and define a deadbolt pivot plate assembly that is affixed to the deadbolt assembly, and can pivot with respect to the deadbolt assembly.

10. The method of claim 9, further comprising:
- installing the deadbolt assembly on the door, the installing including:
- positioning the deadbolt assembly in the door; and
- fastening the deadbolt pivot plate assembly to the door.

11. The method of claim 10, wherein the back plate and the front plate are fastened together above and below the bolt housing.

12. The method of claim 10, wherein the door includes a beveled door edge, and wherein the deadbolt pivot plate assembly pivots to accommodate the beveled door edge.

13. The method of claim 10, wherein the deadbolt pivot plate assembly provides a rattle-free attachment to the door.

14. A deadbolt pivot plate assembly for angled attachment to a beveled door edge of a door configured to adjust a deadbolt for misalignments between a door and a door jamb, comprising:
- a first plate;
- a second plate coupled to the first plate;
- a hinge assembly affixed to an open end of a bolt housing, the hinge assembly pivots about a vertical axis proximate; and
- the hinge assembly confined between the first plate and the second plate and enabling a pivot plate assembly including the first and second plate to pivot on the vertical axis; and
- wherein when attached to the door, the pivot plate assembly is mounted to a surface of the beveled edge of the door and at an oblique angle relative to the bolt housing.

15. The deadbolt pivot plate assembly of claim 14, wherein the second plate includes a pair of alignment tabs on opposing sides of the second plate, and wherein the first plate includes a pair of corresponding alignment slots defined on opposing sides of the first plate, wherein the opposing tabs fit within the corresponding alignment slots to align the second plate with the first plate.

16. The deadbolt pivot plate assembly of claim 14, wherein the deadbolt pivot plate assembly is vertically pivotable throughout a range of motion.

17. The deadbolt pivot plate assembly of claim 14, wherein the hinge assembly includes tabs that provide a torsional spring force throughout a range of motion.

18. The deadbolt pivot plate assembly of claim 14, wherein the hinge assembly is a constant torque hinge.

19. The deadbolt pivot plate assembly of claim 14, wherein the deadbolt pivot plate assembly provides a rattle-free attachment to the door.

\* \* \* \* \*